United States Patent [19]
Fukuchi et al.

[11] Patent Number: 5,751,888
[45] Date of Patent: May 12, 1998

[54] MOVING PICTURE SIGNAL DECODER

[75] Inventors: Hiroyuki Fukuchi; Kinya Osa, both of Tokyo, Japan

[73] Assignee: Nippon Steel Corporation, Tokyo, Japan

[21] Appl. No.: 659,573

[22] Filed: Jun. 6, 1996

[30] Foreign Application Priority Data

Jun. 6, 1995 [JP] Japan ................................ 7-163018

[51] Int. Cl.$^6$ .............................. H04N 5/783; H04N 5/76
[52] U.S. Cl. ................................ 386/68; 386/81; 386/111
[58] Field of Search ................................ 348/567, 568, 348/441, 420, 412; 386/123, 86, 4, 1, 7, 33, 35, 37, 109, 68, 81, 111, 6, 8, 112; H04N 5/783, 5/76

[56] References Cited

U.S. PATENT DOCUMENTS

| | | | |
|---|---|---|---|
| 4,924,310 | 5/1990 | Von Brandt | 348/420 |
| 5,305,113 | 4/1994 | Iwamura et al. | 386/123 |
| 5,339,167 | 8/1994 | Kuroda | 386/123 |
| 5,436,665 | 7/1995 | Ueno et al. | 348/412 |
| 5,477,397 | 12/1995 | Naimpally et al. | 386/123 |
| 5,528,301 | 6/1996 | Hau et al. | 348/441 |
| 5,598,222 | 1/1997 | Lane | 348/568 |
| 5,614,957 | 3/1997 | Boyce et al. | 348/567 |

FOREIGN PATENT DOCUMENTS

A-5-145887  6/1993  Japan .

OTHER PUBLICATIONS

"Digital Image Processing" by William K. Pratt, 2nd Ed., §4.3.2 Interpolation Functions, (1991).

*Primary Examiner*—Tommy P. Chin
*Assistant Examiner*—LuAnne P. Din
*Attorney, Agent, or Firm*—Pollock, Vande Sande & Priddy

[57] ABSTRACT

A moving picture signal decoder for decoding compressed picture data resulting from compressing original picture data by use of a combination of picture information including picture data of each frame of a moving picture signal and motion vector information including a motion vector between frames, the moving picture signal decoder comprising demultiplexer device for demultiplexing the compressed picture data to obtain the picture data and the motion vector; decoding device for decoding the picture data to obtain decoded picture data; down-sampling device for (i) down-sampling the decoded picture data so that the decoded picture data has 1/M a number of pixels included in the original picture data, where M is a positive integer, in one of a reverse playback mode and a fast forward/reverse playback mode and (ii) passing the decoded picture data as it is in a normal playback mode; scaling device for (i) multiplying the motion vector by 1/m in one of the reverse playback mode and the fast forward/reverse playback mode and (ii) passing the motion vector as it is in the normal playback mode; memory device for storing the decoded picture data output from the down-sampling device; and memory reading device for reading the sampled picture data from the memory device in a predetermined order by using the motion vector output from the scaling device.

6 Claims, 4 Drawing Sheets

FIG.3A

| $I_1$ | $P_1$ |
|---|---|
| $B_1$ | $B_2$ |

FIG.3B

| $I_1'$ | $B_1'$ | $B_2'$ | $P_1'$ |
|---|---|---|---|
| $B_3'$ | $B_4'$ | $P_2'$ | $B_5'$ |
| $B_6'$ | $P_3'$ | $B_7'$ | $B_8'$ |
| $P_4'$ | $B_9'$ | $B_{10}'$ | $P_5'$ |

FIG.3C

| $I_1'$ | $P_1'$ | $P_2'$ | $P_3'$ |
|---|---|---|---|
| $P_4'$ | $P_5'$ | | |
| | | | |
| | | | |

FIG.4
PRIOR ART

| $I_1$ | $B_1$ | $B_2$ | $P_1$ | $B_3$ | $B_4$ | $P_2$ | $B_5$ | $B_6$ | $P_3$ | $B_7$ | $B_8$ | $P_4$ | $B_9$ | $B_{10}$ | $P_5$ |

MOVING PICTURE SIGNAL DECODER

BACKGROUND OF THE INVENTION

1. Field of the Invention

The present invention relates to moving picture signal decoders for decoding compressed picture data resulting from compressing (high-efficiency encoding) original picture data by using a combination of picture information indicating picture data of each frame of a moving picture signal and movement vector information indicating a movement vector between frames, and particularly to a decoder suitable for decoding compressed picture data obtained by a data compression technique called MPEG (moving picture experts group).

2. Description of the Related Art

There are known various methods for coding a moving picture signal at high efficiency. Those methods include, for example, techniques such as encoding within picture for removing spacial redundancy of picture, and forward predictive coding and bidirectional predictive coding for removing redundancy in the time base direction of moving picture. The MPEG system is standardized (ISO/IEC 11172-2 standard) as one system of high efficiency coding using these techniques.

In the MPEG system, DCT (discrete cosine transform) is employed as coding within a picture for removing spacial redundancy of a picture, and the picture is divided into blocks each of which consists of 8×8 pixels and then processed. In addition, it uses forward predictive coding for removing redundancy in the time base direction of a certain picture and another picture just before that picture, and bidirectional predictive coding for removing redundancy in the time base direction of a certain picture and other pictures just before and after that picture. In this case, a block of 8×8 pixels is the fundamental unit. In the following descriptions, the internally coded picture is referred to as "I picture", the forwardly predictive-coded picture as "P picture", and the bidirectionally predictive-coded picture as "B picture".

A brief description will be made of the process for picture data in the MPEG system. On the encoding side, picture data, including variable-length coded picture information and movement vector information is obtained from original picture data. Header information is added to the picture data to form compressed picture data. The header information includes quantized step information indicating the unit of quantization that is used when picture information is variable-length coded. The movement vector information indicates the movement of an object between two pictures. The picture information of an I picture is obtained only from one picture, while the picture information of a P picture is obtained from the difference between one picture and the preceding picture just before that picture. In addition, the picture information of a B picture is obtained from the differences between one picture and the preceding and following pictures just before and after that picture. Usually, two B pictures succeed. Since decoding a B picture needs the I picture or P picture just before or after that B picture, it is necessary that on the encoding side, the picture following the B picture with respect to time is first coded as an I picture or a P picture. Therefore, for bidirectional predictive coding, pictures are interchanged with respect to time and then encoded.

On the decoding side, a moving picture signal decoder is used to cause the compressed picture data to undergo the reverse process to the process on the encoding side, thereby reproducing the original picture data. The moving picture signal decoder needs a picture memory having enough capacity to store picture data of usually 3 to 4 pictures, because an I picture or P picture must be stored for use in decoding a B picture.

Also, the MPEG system employs the a unit of pictures comprising more than one picture, called group of pictures (GOP) as shown in FIG. 4. This is necessary to provide entry points for random access. The GOP can be formed by an arbitrary combination of I, P and B pictures, but generally by a periodical structure of an I picture at the head, followed by P pictures with a constant period (for example, three pictures), between which B pictures are located. The length of GOP may be arbitrary, but a length of 15 to 30 pictures is generally used.

A digital video playback apparatus is known as one example of a system having a moving picture signal decoder. It is also desirable that the digital video playback apparatus have a reverse reproduction function as in the analog-type video playback apparatus. In order to reversely reproduce the recorded moving pictures, it is necessary to decode the pictures within a GOP, store all the decoded pictures and read the stored pictures in the opposite direction with respect to time. In this case, it is assumed that the GOP units of recorded data are reproduced in the opposite direction with respect to time in the digital video playback apparatus.

However, in order to achieve this reverse reproduction function, it is necessary to store all pictures within a GOP and thus it is necessary to provide additional memory having enough capacity to store picture data of 10 pictures or more in addition to the picture memory usually required for reproduction. Therefore, the circuit scale and cost are increased. This is also a problem in fast forward reproduction and fast reverse reproduction.

A method of avoiding the increase of picture memory capacity is disclosed in JP-A-5-145887. In this method, only I pictures are reproduced with P pictures, and B pictures removed in the fast forward reproduction or fast reverse reproduction. In this method, however, since a considerable number of pictures to succeed are removed, the reproduced pictures intermittently occur with the result that natural smooth reproduction is lost.

SUMMARY OF THE INVENTION

Accordingly, it is an object of the invention to provide a moving picture signal decoder capable of achieving a smooth trick play such as reverse reproduction without the increase of circuits and cost.

According to the invention, there is provided a moving picture signal decoder for decoding compressed picture data resulting from compressing original picture data by use of a combination of picture information indicating picture data of each frame of a moving picture signal and movement vector information indicating a movement vector between frames, this decoder including sampled picture decoding means for decoding received compressed picture data to obtain sampled picture data having 1/M the number of pixels included in the original picture data where M is a positive integer, memory means for storing the sampled picture data obtained by the sampled picture decoding means, and memory reading means for reading the sampled picture data from the memory means in a predetermined order.

According to the above construction, since the sampled picture decoding means obtains compressed picture data having only 1/M the pixels included in the original picture data, pictures of M times as many as the usual picture data can be stored in the same memory means. Therefore, all the I, P and B pictures can be used for trick play without increasing the memory capacity. It is now assumed that a four-picture memory is necessary for normal play and that a 16-picture memory is needed for trick play. If M is selected to be four (M=4), the number of memories necessary for the trick play equals to that for the normal play, and thus no additional memory is required. Therefore, the circuit scale and cost are not changed as compared with those of the conventional apparatus. That is, smooth trick play can be achieved without the increase of circuit scale and cost.

BRIEF DESCRIPTION OF THE DRAWINGS

FIGS. 3A to 3C are conceptional diagrams showing data structures within the memory circuit 9 included in the moving picture signal decoder according to the embodiment of the invention.

FIG. 4 is a conceptional diagram of data structure within a GOP of compressed picture data according to MPEG standard.

DESCRIPTION OF THE PREFERRED EMBODIMENTS

One embodiment of the present invention will be described with reference to FIGS. 1 to 5B. The moving picture signal decoder according to this embodiment is suited for MPEG system.

Figure 1:
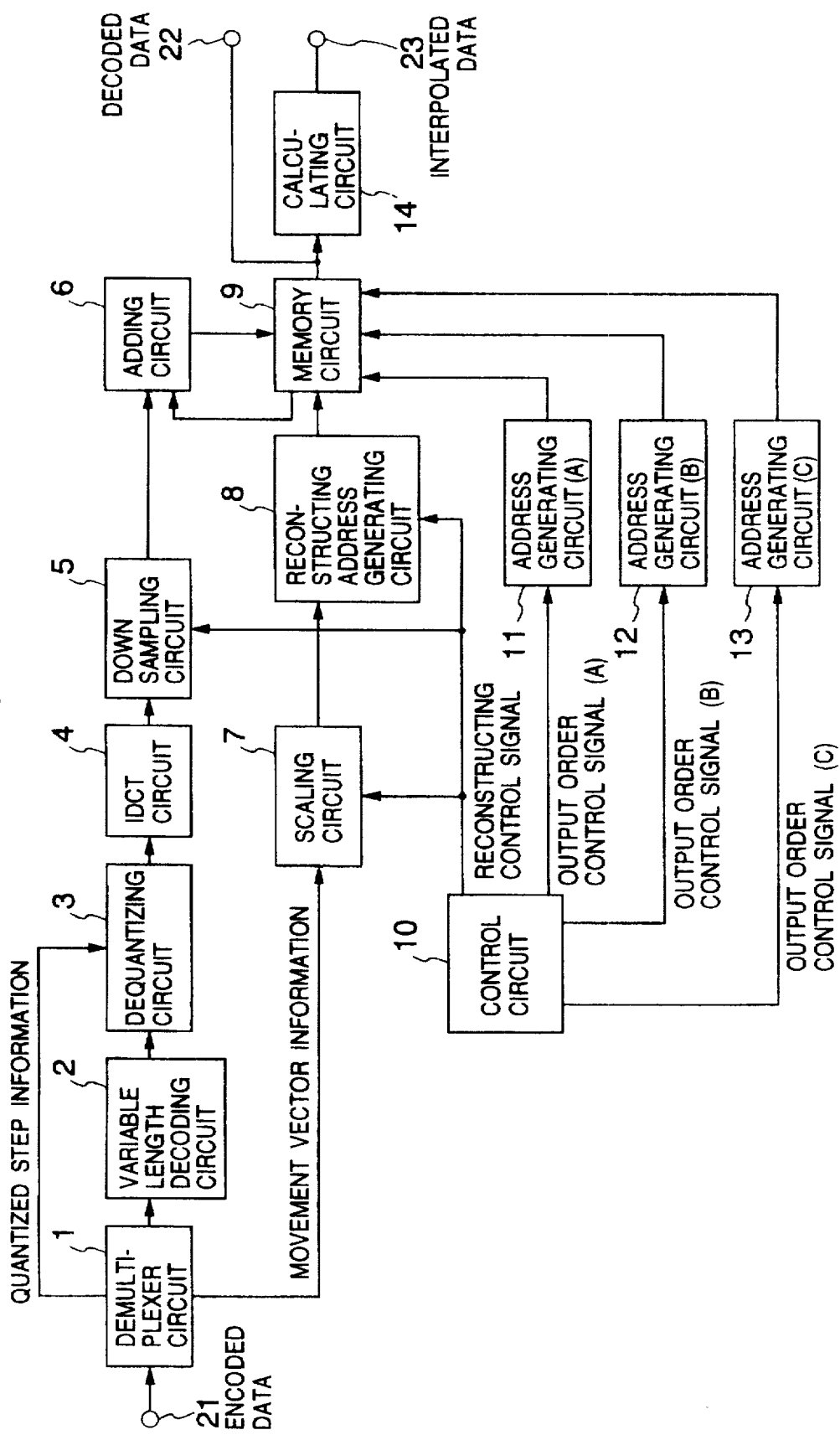
FIG. 1 is a block diagram of the whole structure of a moving picture signal decoder according to one embodiment of the invention.

Referring to FIG. 1, the moving picture signal decoder includes an input terminal 21, a demultiplexer circuit 1, a variable length decoding circuit 2, a dequantizing circuit 3, an IDCT (inverse DCT) circuit 4, a down sampling circuit 5, an adding circuit 6, a scaling circuit 7, a reconstructing address generating circuit 8, a memory circuit 9, a control circuit 10, address generating circuits (A to C) 11 to 13, a calculating circuit 14 and output terminals 22 and 23.

The operation for a normal playback mode will first be described. The MPEG-encoded compressed data sent from an external disk playback circuit not shown is supplied through the input terminal 21 to the demultiplexer circuit 1. The demultiplexer circuit 1 separates this compressed data into header information and picture data. Of the separated header information, the quantized step information which indicates the quantization unit of the picture information is fed to the dequantizing circuit 3, and the movement vector information which indicates the movement between two pictures is supplied through the scaling circuit 7 to the reconstructing address generating circuit 8.

The variable length encoded picture data is supplied from the demultiplexer circuit 1 to the variable length decoding circuit 2, where it is decoded. The decoded result is fed to the dequantizing circuit 3. The dequantizing circuit 3 dequantizes the variable-length decoded data on the basis of the quantized step information from the demultiplexer circuit 1. Then, the IDCT circuit 4 makes IDCT conversion to the dequantized data. The converted result is supplied through the down sampling circuit 5 to the adding circuit 6. In the playback mode, the down sampling circuit 5 outputs the input data as it is.

The output result from the IDCT circuit 4 is picture data itself as far as the I picture is concerned. In this case, the output result of the IDCT circuit 4 is not changed by the adding circuit 6, and stored in the memory circuit 9 at the location indicated by the address output from the reconstructing address generating circuit 8.

On the other hand, as to the P picture or B picture, the output result from the IDCT circuit 4 is a difference signal between two pictures after predictive coding. Therefore, the adding circuit 6 adds the output result of the IDCT circuit 4 and the picture data on the basis of which the predictive coding is made. The picture used as a basis for the predictive coding of P picture is I picture or P picture before that P picture. The picture used as a basis for the predictive coding of B picture is I picture or P picture before or after that B picture. The pictures necessary for the addition are read out from the locations of memory circuit 9 indicated by the address output from the reconstructing address generating circuit 8, and then supplied to the adding circuit 6. When movement information is used in the predictive coding, the reconstructing address generating circuit 8 responds to the movement vector information output from the demultiplexer circuit 1 to correct the read address for the memory circuit 9. The picture read out from the memory circuit 9 is fed to the adding circuit 6. The added result of the adding circuit 6 is stored in the memory circuit 9 at the location indicated by the address output from the reconstructing address generating circuit 8.

The pictures thus reconstructed are once stored in the memory circuit 9, and read in a different order on the basis of the read address output from the address generating circuit (A) 11 for normal playback which is controlled by the control circuit 10. The read out pictures are produced at the output terminal 22. Since a bidirectional prediction technique is used upon encoding, the order of the pictures is changed with respect to time.

Figure 2:
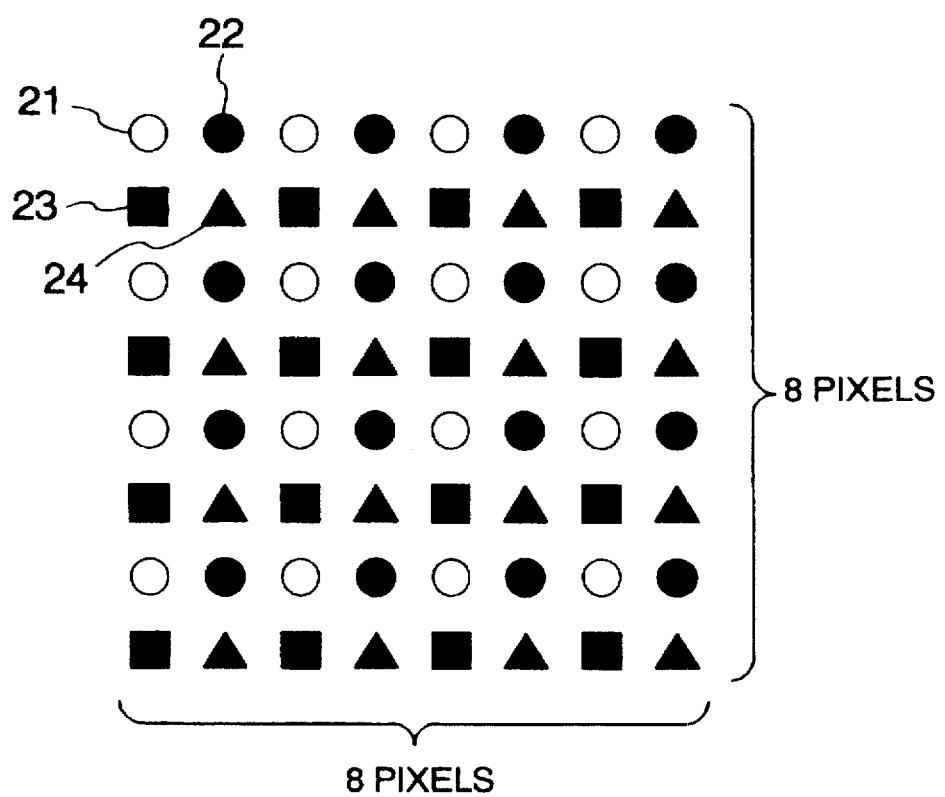
FIG. 2 shows pixels to be sampled by the down sampling circuit 5 of the moving picture signal decoder according to the embodiment of the invention.

A trick playback mode will be described below. The down sampling circuit 5 under control of the control circuit 10 down-samples the picture data from the IDCT circuit 4 to produce sampled picture data so that the number of pixels included in the picture data can be reduced to 1/M. Here, M is a positive integer, M=1 for normal playback mode or M≧2 for trick playback mode. In the later description, M=4 is selected. FIG. 2 shows the pixels of one block included in the picture data from the IDCT circuit 4. The white small circles 21 indicate the pixels to be sampled by the down sampling circuit 5, and the black small circles 22, squares 23 and triangles 24 represent the pixels to be removed, or not sampled. One block of the picture data from the IDCT circuit 4 has 8×8 pixels, but one block of the sampled picture data includes 4×4 pixels since the numbers of horizontal pixels and vertical pixels are respectively reduced to ½ by down sampling. After this down sampling, the following operation such as adding operation, writing and reading operations of the memory and so on are made on each block unit of 4×4 pixels.

The control circuit 10 controls the reconstructing address generating circuit 8 to generate the write or read address to the memory circuit 9. The picture data with the pixel count reduced to ¼ the normal pixel count, which is produced by the down sampling circuit 5 or processed by the adding circuit 6, is written in the memory circuit 9 at the locations corresponding to the write address. And the data stored in the memory circuit 9 is read out from the locations corresponding to the read address. Here, the sampled picture data may be produced as reduced-size picture data of which the picture size has been reduced to ¼ the normal one or as normal-size picture data by recovering the removed pixels by the interpolation as described later. In the former case, the size of the movement vector is also necessary to be 1/√M=½, which can be achieved by the scaling circuit 7 under control of the control circuit 10.

When the sampled picture data is produced as reduced-size picture data, the reconstructed pictures once stored in the memory circuit 9 are read in a different order according to the read address generated from the address generating circuit (B) 12 for reduction playback mode under control of the control circuit 10. The read data is output from the output terminal 22.

When the sampled picture data is produced as normal-size picture data, the reconstructed pictures once stored in the memory circuit 9 are read in a different order according to the read address generated from the address generating circuit (C) 13 for interpolation playback mode under control of the control circuit 10. The read data is interpolated by the calculating circuit 14, and output from the output terminal 23. The interpolation in the calculating circuit 14 is made such that the pixel indicated by the black circle 22 in FIG. 2 is obtained by averaging the two left and right pixel values, the pixel of the black square 23 by averaging the two upper and lower pixel values, and the pixel of the black triangle 24 by averaging the four diagonal pixel values.

A detailed description will be made of the read and write operations of the memory circuit 9 for producing the sampled picture data as reduced-size picture data.

As far as the I picture is concerned, the output from the IDCT circuit 4 is the same picture data itself as in the normal playback mode. In this case, the output from the down sampling circuit 5 is not processed at all in the adding circuit 6, or directly supplied to the memory circuit 9 where it is stored at the locations corresponding to the address generated by the reconstructing address generating circuit 8.

As to the P picture or B picture, the output from the IDCT circuit 4 is a difference signal after prediction. Therefore, the adding circuit 6 adds the output from the down sampling circuit 5 and the picture data used as a basis for predictive coding. When the P picture is concerned, the picture used as a basis for predictive coding is the I picture or P picture just before that picture. When the B picture is concerned, it is the I picture or P picture before or after that picture. The pictures necessary for the addition are read in blocks of 4×4 pixels from the memory circuit 9 on the basis of the address generated by the reconstructing address generating circuit 8, and supplied to the adding circuit 6.

When movement information is used upon prediction, the reconstructing address generating circuit 8 corrects the read address to the memory circuit 9 on the basis of the movement vector information which has been fed from the demultiplexer circuit 1 to the scaling circuit 7, thereby scaled to the size of ½ in horizontal and vertical directions. The data thus read from the memory circuit 9 on the basis of the corrected read address is supplied to the adding circuit 6.

The added result from the adding circuit 6 is stored in blocks of 4×4 pixels in the memory circuit 9 at the locations according to the address generated by the reconstructing address generating circuit 8.

The reconstructed pictures of ¼ the original size are once stored in the memory circuit 9, and then read out in a different order according to the address generated by the address generating circuit (B) 12. The read pictures are output from the output terminal 22. The reason for changing the order of reading the pictures is that for MPEG system the I, P, B pictures are transmitted in this order different from the time base of the original pictures. For example, the GOP transmitted in the order of I, P, B, B, . . . must be read out in the order of I, B, B, P, - - - in order to be reproduced faithfully to the time base of the original pictures.

When the picture data is decoded to be 1/M the original picture size, control information indicative of what size it is to be decoded in is supplied as a reconstructing control signal from the control circuit 10 to the down sampling circuit 5, scaling circuit 7 and reconstructing address generating circuit 8. Also, the control circuit 10 supplies to the address generating circuit (B) 12 an output order control signal (B) indicative of which order the picture data are read in from the memory circuit 9.

FIGS. 3A to 3C show data structures within the memory circuit 9. It is assumed that in the normal playback mode the memory circuit 9 can store four pictures as shown in FIG. 3A. FIG. 4 shows an example of GOP. In this embodiment, 16 pictures, that is, the whole GOP each having ¼ the original picture size as shown in FIG. 3B can be stored in the memory of the size shown in FIG. 3A. Therefore, if the generally used GOP length is 15, reverse reproduction can be satisfactorily performed. In other words, if encoded data of GOP units is continuously supplied from the outside to the moving picture signal decoder of this embodiment in the opposite direction along the time base, it can be reversely reproduced.

In FIGS. 3B and 3C, the pictures represented by reference characters with prime, such as I', P' and B' indicate that they have ¼ the size of the original pictures I, P and B, respectively.

Figure 5A:
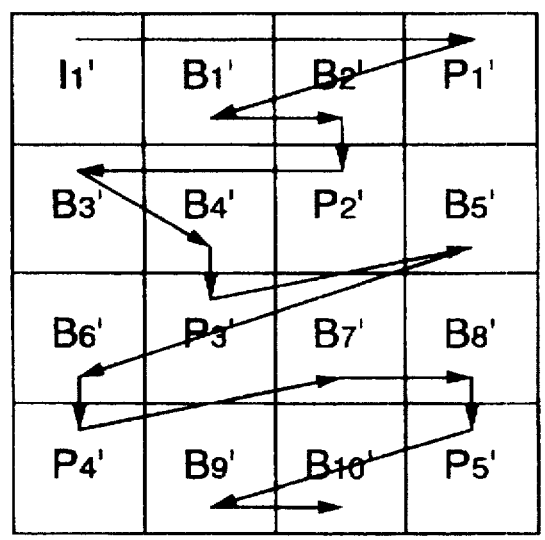
FIG. 5A is a conceptional diagram showing the order in which data is written in the memory circuit 9 of the moving picture signal decoder according to the embodiment of the invention.
Figure 5B:
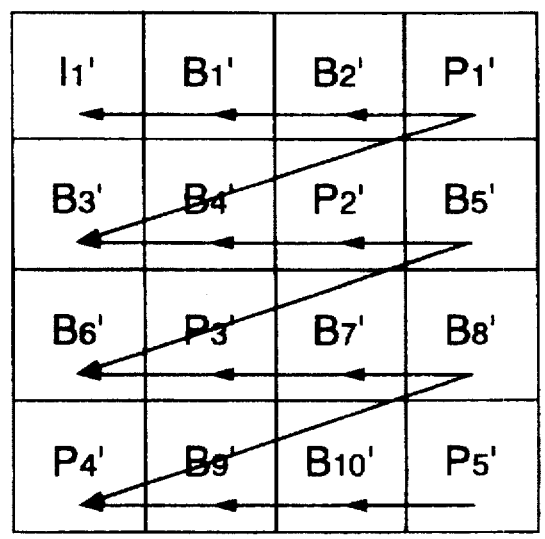
FIG. 5B is a conceptional diagram showing the order in which data is read from the memory circuit 9 of the moving picture signal decoder according to the embodiment of the invention.

FIG. 5A shows the order in which the pictures of GOP shown in FIG. 4 are written in the memory. In other words, the pictures within the GOP shown in FIG. 4 are written in the memory at the locations indicated in FIG. 5A in the order or I₁', P₁', B₁', B₂', P₂', . . . , B₁₀' as indicated by arrows. If the written data are read by scanning each row in the order of the first row to the fourth row, the pictures can be reproduced in the positive direction along the time base of the original pictures. For reverse reproduction, the written pictures are read by scanning each row in the order of the fourth row to the first row, that is, in the reverse direction to the positive direction as shown in FIG. 5B.

In the system according to this embodiment, although the size or resolution of the pictures is reduced to ¼ the original one, all pictures within each GOP are decoded. Thus, even when reverse reproduction or fast forward playback is performed, no picture is removed and hence smooth reverse reproduction or fast forward reproduction is possible.

While in this embodiment all I, P and B pictures within GOP are decoded, only I and P pictures may be decoded and stored. In this case, since B picture is not reconstructed, the processing time can be considerably reduced. In addition, since B picture is not stored in the memory, even longer GOP than the example as shown in FIG. 4 can be processed. FIG. 3C shows an example of only pictures I and P stored. In this case, if encoded data of GOP units is continuously supplied from the external in the opposite direction along the time base, fast reverse reproduction can be achieved.

Although pictures of 1/M resolution are produced from the moving picture signal decoder according to the invention, the reverse reproduction is generally performed for searching recorded pictures, and hence no problem is caused by the resolution of this invention. Particularly when fast playback is performed, the resolution of this invention will be enough.

According to this invention, a reverse playback function can be provided in digital video playback apparatus without additional memories, or without increasing the circuit scale and cost.

Moreover, if only I picture and P picture are reconstructed, and reversely reproduced, a fast reverse reproduction function can be provided.

What is claimed is:

1. A moving picture signal decoder for decoding compressed picture data resulting from compressing original picture data by use of a combination of picture information including picture data of each frame of a moving picture signal and motion vector information including a motion vector between frames, said moving picture signal decoder comprising:

demultiplexer means for demultiplexing the compressed picture data to obtain the picture data and the motion vector;

decoding means for decoding the picture data to obtain decoded picture data;

down-sampling means for (i) down-sampling the decoded picture data so that the decoded picture data has 1/M a number of pixels included in the original picture data, where M is a positive integer, in one of a reverse playback mode and a fast forward/reverse playback mode and (ii) passing the decoded picture data as it is in a normal playback mode;

scaling means for (i) multiplying the motion vector by $1/\sqrt{M}$ in one of the reverse playback mode and the fast forward/reverse playback mode and (ii) passing the motion vector as it is in the normal playback mode;

memory means for storing the decoded picture data output from said down-sampling means; and memory reading means for reading the sampled picture data from said memory means in a predetermined order by using the motion vector output from said scaling means.

2. A moving picture signal decoder according to claim 1, wherein said memory reading means reads the decoded picture data from said memory means in the opposite direction to a time base direction of the original pictures.

3. A moving picture signal decoder according to claim 1, wherein said compressed picture data is obtained by encoding the original picture data by MPEG (moving picture experts group) system.

4. A moving picture signal decoder according to claim 3, wherein said decoding means decodes all I picture, P picture and B picture within a GOP (group of pictures) included in the compressed picture data encoded by the MPEG system.

5. A moving picture signal decoder according to claim 3, wherein said decoding means decodes only I picture and P picture within a GOP (group of pictures) included in the compressed picture data encoded by the MPEG system.

6. A moving picture signal decoder according to claim 1, wherein M is 4.

* * * * *